(12) United States Patent
Lykes et al.

(10) Patent No.: US 11,405,697 B2
(45) Date of Patent: Aug. 2, 2022

(54) TIME-BASED WORKFLOW FOR LINEAR AD INSERTION

(71) Applicant: Viamedia, Inc., Lexington, KY (US)

(72) Inventors: Randy Lykes, Lexington, KY (US);
Wendell Decker, Lexington, KY (US);
James T O'Neill, Bedford, KY (US);
Adam Lynch, Lexington, KY (US);
Paul Cavins, Newburg, IN (US)

(73) Assignee: Viamedia, Inc., Lexington, KY (US)

( * ) Notice: Subject to any disclaimer, the term of this patent is extended or adjusted under 35 U.S.C. 154(b) by 3 days.

(21) Appl. No.: 16/989,581

(22) Filed: Aug. 10, 2020

(65) Prior Publication Data

US 2020/0374599 A1    Nov. 26, 2020

Related U.S. Application Data

(63) Continuation-in-part of application No. 16/577,858, filed on Sep. 20, 2019, now Pat. No. 11,057,134, which is a continuation-in-part of application No. 16/227,160, filed on Dec. 20, 2018, now Pat. No. 10,757,462.

(51) Int. Cl.
*H04N 21/81* (2011.01)
*H04N 7/173* (2011.01)

(52) U.S. Cl.
CPC ....... *H04N 21/812* (2013.01); *H04N 7/17318* (2013.01)

(58) Field of Classification Search
None
See application file for complete search history.

(56) References Cited

U.S. PATENT DOCUMENTS

| | | | |
|---|---|---|---|
| 8,738,787 B2 | 5/2014 | Cobb et al. | |
| 2013/0247095 A1* | 9/2013 | Weihs | H04N 21/2668 725/34 |
| 2016/0345074 A1* | 11/2016 | Serbest | H04L 67/306 |
| 2018/0255331 A1 | 9/2018 | McLean et al. | |

(Continued)

OTHER PUBLICATIONS

Digital Program Insertion Cueing Message for Cable, SCTE 1E 35 Standard, Society of Cable Telecommunications Engineers (2016), pp. 1-73.

(Continued)

*Primary Examiner* — Omar S Parra
(74) *Attorney, Agent, or Firm* — Dergosits & Noah LLP

(57) ABSTRACT

A programmable and universal video platform enabling digital ads from ad sales teams, online digital exchanges, demand side platforms or other digital video advertising aggregators, to be inserted into linear television cable programming feeds. Content programmers distribute a programming schedule file for each linear programming feed. This data is then combined in the traffic and billing system with the advertising insertion orders from the various sales channels to create a local ad insertion schedule file. This schedule file includes a planned ad spot, but a time-based approach to ad insertion allows the schedule file to be modified such that the planned ad spot can be replaced with a replacement ad selected using the VAST digital ad selection protocol. Detection of the standard cue message in the programming feed triggers insertion of the replacement ad from the modified schedule file.

19 Claims, 12 Drawing Sheets

(56) References Cited

U.S. PATENT DOCUMENTS

2019/0122659 A1     4/2019  Miller et al.
2019/0266632 A1*    8/2019  Milford ............ H04N 21/23418
2019/0387262 A1*   12/2019  Link ................... H04L 65/1089
2020/0059693 A1*    2/2020  Neumeier ........ H04N 21/44016

OTHER PUBLICATIONS

Video Ad Serving Template (VAST), Ver. 4.0, Interactive Advertising Bureau (2016), pp. 1-74.
Digital Video In-Stream Ad Format Guidelines, Interactive Advertising Bureau (2016), pp. 1-23.
International Search Report and Written Opinion from International Patent Application No. PCT/US21/35413, dated Aug. 31, 2021.

* cited by examiner

CCMS Schedule: Filename format

MDDCCHHH.SCH where:
        M    =    Month, hexadecimal range 1-C
        DD   =    Day of month, decimal range 01-31
        CC   =    Channel identifier, decimal range 01-99
        HHH =    Headend identifier, decimal range 001-099

FIG. 8

CCMS Schedule: Data Record format

| Field | Name | Bytes |
|---|---|---|
| 1 | Event type | 1-3 |
| 2 | Scheduled date | 5-8 |
| 3 | Scheduled time | 10-15 |
| 4 | Window start time | 17-20 |
| 5 | Window duration | 22-25 |
| 6 | Break number in window | 27-29 |
| 7 | Position number within break | 30-33 |
| 8 | Scheduled length | 35-40 |
| 9 | Actual aired time | 42-47 |
| 10 | Actual aired length | 49-56 |
| 11 | Actual aired position with break | 58-60 |
| 12 | Spot identification | 62-72 |
| 13 | Status code | 74-77 |
| 14 | Advertiser name | 79-110 |
| 15 | Advertiser spot name | 112-131 |
| 16 | Scheduled/fill | 133-136 |
| 17 | Reserved – traffic | 138-143 |
| 18 | User defined | 145-NNN |

FIG. 9

TIME-BASED WORKFLOW FOR LINEAR AD INSERTION

TECHNICAL FIELD

This disclosure relates in general to advertising for linear video programming, and more particularly, to the selection and insertion of digital advertising content into linear cable television programming.

BACKGROUND

A significant portion of television viewing is linear programming on cable networks (e.g., ESPN, TNT, CNBC). These networks are carried by multichannel video programming distributors ("MVPDs"), which are services that provide multiple television channels to customers through a set top box ("STB") installed at the subscriber's location. Examples of MVPDs include Charter, Comcast, Altice, Cox and others. Linear programming consists of a continuous audio/video feed for the duration of a cable network program or program segment.

The cable networks identify within each linear programming stream available time slots ("avails") for insertion of advertising content ("ads") locally by an MVPD. In a typical scenario, approximately 15 minutes per hour of advertising are filled from national advertising campaigns which run throughout the entire country on that cable network. Another 2-3 minutes per hour are filled with local advertising content, either by splicing the ad content into the programming stream or by stopping and starting the programming stream allowing for local ad insertion gear to fill the time with commercials.

Traditionally, linear ad insertion platforms do not communicate with digital advertising platforms. The standards for communication are distinct to each and do not cross connect. Traditional ad insertion utilizes fixed schedules by network and local avail opportunity for ad playout. Traditional linear ad insertion platforms do not reference or track performance based on impressions sought or delivered nor do they provide any additional dynamic targeting parameters (traditional platforms may provide sub-zone capabilities for hard-wired sub designated market area ("DMA") targeting ability). Typically, 80% of all revenues run on the "top" 20 to 25 cable networks. However, when over-night inventory is accounted for, the sell-thru percentage on the top 20 to 25 cable networks is significantly reduced, meaning that there is a substantial amount of "unsold" avails and substantial incremental opportunities for targeted audience-centric marketing.

Thus, the growth of traditional cable television advertising has been flat as advertisers have moved their resources to take advantage of the growing consumer demand for digital media, along with the ease of placing digital ads on websites through digital ad exchanges and through programmatic platforms onto desktops, laptops, and mobile devices. Almost any digital ad server can place an ad on any platform based on data to target the right consumer. In addition, digital technology enables the ability to use data to hyper target the right audience in filling advertising avails. This ability to hyper-target the right "audience" on any digital media property without a preset schedule and only paying for the actual impressions or impression counts, which are accurate to industry standard acceptance, and thus maximizing ad spending, is why digital advertising revenues have grown exponentially, along with the increase in digital video consumption.

For television advertising placement to work as effectively and efficiently, the MVPDs and their advertising partners must address legacy standards and technology.

The Society of Cable Telecommunications Engineers ("SCTE") has promulgated a relevant standard, SCTE 35, for defining a "cue message" to specify how to fill the avails in the programming television stream, entitled Digital Program Insertion Cueing Message for Cable (2016). SCTE 35 is the core signaling standard for advertising and distribution control of content for content providers and content distributors, and thus, SCTE 35 cue signals are incorporated into the programming feed and used to identify advertising breaks and programming content. In addition, virtually all content providers regularly publish their programming schedules, and more importantly for advertising purposes, the commercial break structures for programs, which may be used to create corresponding linear television schedules.

For online digital advertising, the Interactive Advertising Bureau has set a standard specification for communications between digital ad servers and digital video players called the Video Ad Serving Template ("VAST"). Thus, digital ads served according to the VAST protocol can be played by any digital video player.

However, since MVPDs may utilize different platforms of hardware and software for distribution of the program content, in general they do not utilize the infrastructure required for generating or processing VAST ad calls. In that case, a VAST tag must be specially configured and integrated in the ad insertion infrastructure to allow distribution on a particular distribution platform. The differences in distribution platforms, evidenced by use of different operating systems and set top boxes, presents a measure of difficulty for inserting ads for different MVPDs. Therefore, it would be desirable for an online digital ad serving network to be able to use standard digital ad insertion workflows to access the MVPD's television inventory. Having the capability to serve ads universally onto a variety of different television distribution platforms would enable digital ad serving exchanges to be applied to the ad avails in linear programming of cable TV networks, as well as to over-the-top ("OTT") platforms such as Hulu, Netflix and SlingTV, and privately-managed IPTV networks, without having a preset schedule of breaks. This would enable more avails in linear TV programming to be bought, sold, and measured, and combined with the ability of data processing to utilize audiences as the target and ad impressions as the currency, such an improvement would effectively integrate the linear and digital video advertising ecosystems. This capability would also increase the potential revenues for addressable advertising, namely, sending an individual ad to an individual set top box based on audience targeting data.

In addition, a time-based solution can also be implemented to enable legacy equipment to utilize universal ad serving.

BRIEF DESCRIPTION OF THE DRAWINGS

FIG. 8 is a representation of a standard filename for a programming schedule.

FIG. 9 is a table illustrating the fields in a data record of a programming schedule file.

DETAILED DESCRIPTION

Figure 1:
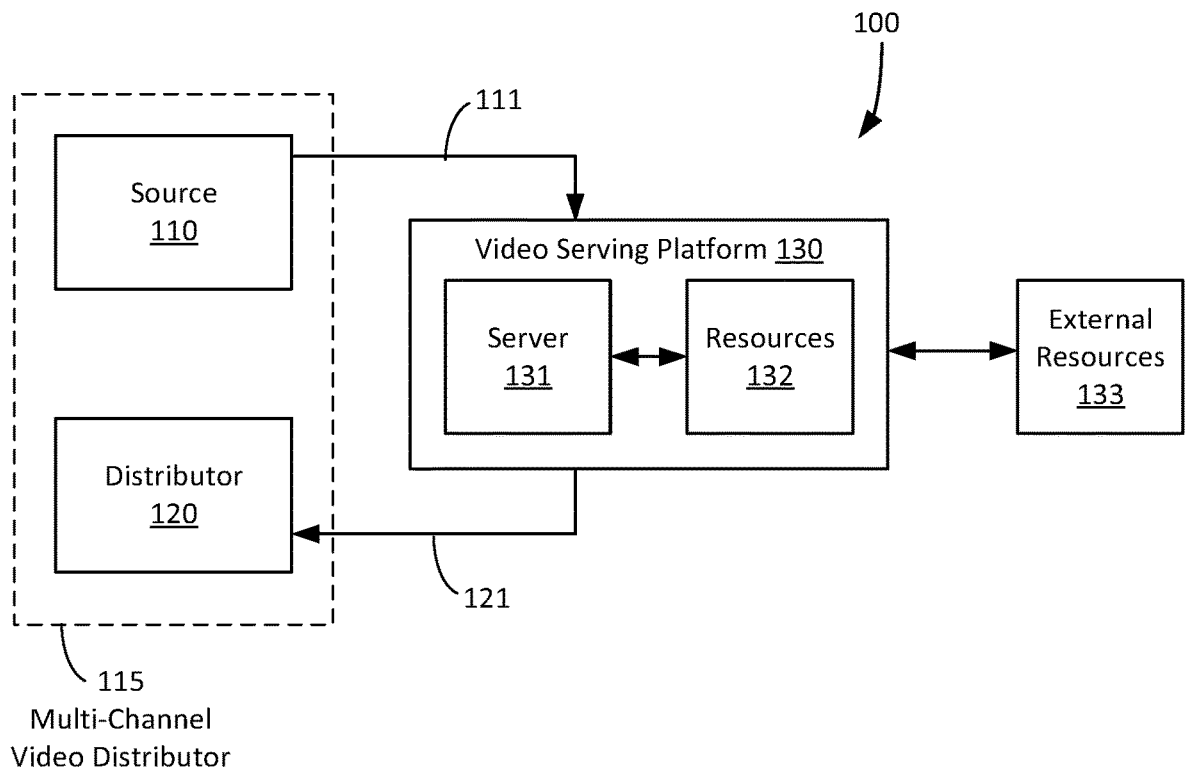
FIG. 1 is a block diagram illustrating a first embodiment of a system for inserting ad content into a linear programming stream.

FIG. 1 illustrates a simple schematic representation of a system 100 for inserting digital video advertisements ("ads") into available spots ("avails") that are designated for content insertion in a linear cable television programming stream. A linear programming stream is one that is continuously broadcast from start to finish of the program, such as regular episodes of a television series or a news broadcast, or a live event such as a sports broadcast. Many if not most avails in linear programming or high-profile linear programming (such as sports events or special events) are filled by national advertising campaigns, but typically avails are made available for local cable providers to insert local advertising at their head end.

The linear programming stream 111 originates from a source receiver or server 110, typically a multi-channel video programming distributor ("MVPD"), and is provided as an input to a video serving platform 130. The video serving platform 130 detects a message, called a "cue" herein, that is embedded within the linear programming stream 111 and which identifies a local ad insertion break that is coming up in the linear programming stream. In some embodiments, the cue may be called a cue message, or a cue tone, or a tag, but in any event the cue is an indicator that signals to video distributors, such as cable television headends, that an avail is coming, and providing details of the avail.

Upon detecting the message identifying an avail, the video serving platform 130 requests encoded (CALM compliant) digital video content to insert into the avail. The request includes the location of the avail in the programming stream, usually the time that the avail will start and end, or the start time and the duration. In one embodiment, the video serving platform 130 includes a first video server 131 that includes a configuration as an ad splicer to insert or splice the digital content into the linear programming stream 111 at the designated avail, as well as internal resources 132, such as one or more additional servers, configured to store digital content, to serve digital content, and to make decisions about appropriate digital content to insert into avails.

There may also be external resources 133 to provide various of these functions. For example, an estimate regarding the number of televisions tuned to a particular program or channel during the ad presentation is useful and desirable as a criteria for selecting the appropriate digital ad content to insert into the avail, and such viewer information may be provided by a third-party audience measurement service or via the MVPD's own media management platform including the MVPD's aggregation of tuning (viewing) information from set top boxes or servers in its distribution network. Advantageously, actual viewing information is available after the ad has been inserted, and the third-party service or the MVPD media management platform can provide information that confirms an actual count of impressions served for a particular ad insert for billing purposes. As another example, the ad decisioning network may be external to the video serving platform 130.

The result of seamlessly generating a VAST request for digital content from a linear programming stream is that online digital ad servers, such as Google Ad Manager, Freewheel, Cadent/Blackarrow, Atlas (Amazon), Appnexus, OpenX and others, can now serve a digital ad into traditional TV distribution platforms without replacing set top boxes or adding firmware.

It is noted that the term "video serving platform" is used in the embodiment of FIG. 1 and is intended to define an integrated platform, comprised of multiple components including a video server and/or an ad splicer, that can perform all the steps required for ad insertion within the integrated video serving platform, including detection of a cue message in the linear programming stream, the generation of an ad request for digital content incorporating information from the cue, the preparation of a VAST response to the ad request, and the serving of digital content identified in the response into the linear programming feed. However, the term "video server" is also used in this description and could be used interchangeably with video serving platform, but more typically will describe a server with less than all of the ad serving features integrated into a single device or related group of devices, but acts as the controller or manager of ad insertion operations. The term "ad splicer" is also used and also refers to a server, but more typically will have and provide more limited features than a video server or a video serving platform.

Figure 2:
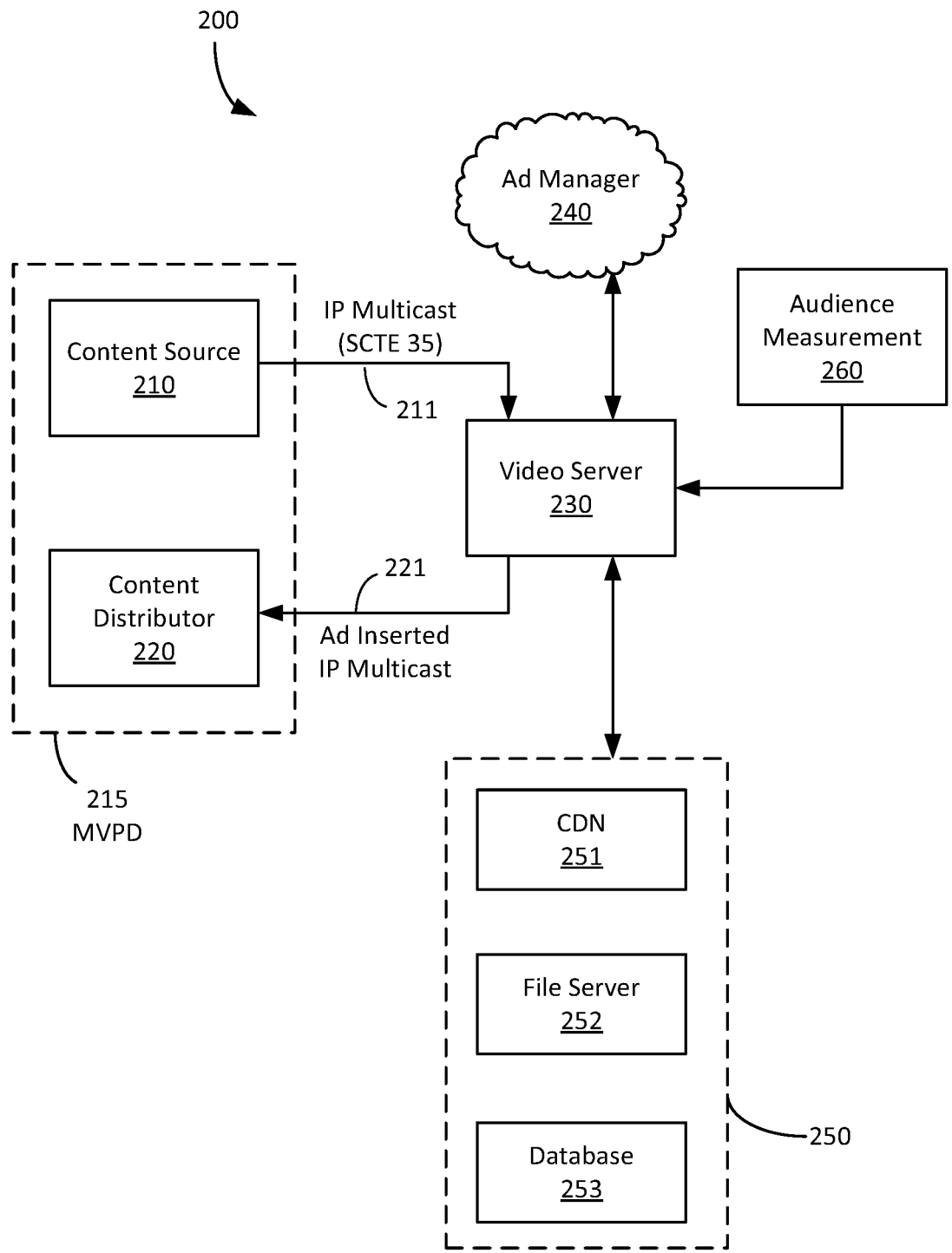
FIG. 2 is a block diagram illustrating a second embodiment of a system for inserting ad content into a linear programming stream.

Referring now to FIG. 2, a more detailed embodiment of a digital ad insertion system 200 is illustrated. In this system 200, a content source 210 provides one or more linear programming streams 211, which in one embodiment are IP multicasts formatted in accord with SCTE 35. A content distributor 220 is the destination of the linear programming feed, once it has been modified to include an inserted ad. The content source 210 and the content distributor 220 may be part of the same multi-channel video programming distributor ("MVPD") 215 or they may be separate MVPDs. Examples of MVPDs can include common subscription television networks available via cable or satellite, such as Comcast, AT&T, Cox, Charter, CenturyLink and others.

Digital ad insertion into the linear programming stream is performed by an ad splicer as part of the video server 230 and decision making for digital ad insertion is performed by an ad manager 240. The video server 230 and the ad manager 240 are typically separate computing units providing multiple functions, but may be integrated together in a single video ad server platform, as illustrated in FIG. 1.

The video server 230 is also in communication with other resources 250, 260 that facilitate decision making with regard to ad targeting and ad selection. For example, the resources 250 can include a content delivery network 251, a file server 252, and a performance database 253, and each of these resource components may be part of an integrated video serving platform with the video server. The content delivery network 251 is dedicated to transmitting requested digital ad content to the video server 230 for insertion into the linear programming stream in accordance with the ad request. The file server 252 stores previously encoded digital ads that are available for selection and insertion as well as post-insertion verification data collected periodically. The database 253 gathers and stores data from all the processes, from which performance reporting and invoicing for executed advertising campaigns can be generated, for example.

All of the components described herein may be implemented using conventional computer-based servers, programmed with instruction sets to realize the various features.

In one embodiment, the video server 230 includes programming features that are useful in constructing an ad request, in particular, by providing data to be used in a configurable data field in the VAST request to pass ad targeting parameters and other important information. Programmable fields in the VAST request may include (i) specification of ad rules, i.e., whether to follow the VAST workflow or a different ad rules workflow; (ii) identifying the content source (like video on demand "VOD"); (iii) listing the specific video identifier (such as a specific VOD asset; for example, someone wants to advertise on all John Wayne movies); (iv) including key-values (such as: daypart ads, DMA, zip code, genre, age, gender, income, etc.); (v) identifying fall-back ad data—if the primary ad is not available, the ADS can send multiple responses based on priority); and (vi) providing instructions to handle any issues that arise under the Children's Online Privacy Protection Act of 1998 ("COPPA"); to name just a few.

Ad splicers and ad insertion servers are generally well known, such as those made by Arris, RGB, Imagine, SeaChange, Culloma Technologies Ltd., Digital Adware, TelVue, and others.

For example, a video player can seamlessly play digital ad content if instructed via a communication layer by a properly constructed VAST response to an ad request. Thus, the process starts with the ad request, which is ultimately triggered by including a "cue" in the linear programming stream, such as a SCTE 35 cue message. However, the ad request may be built ahead of receiving the cue message since many of parameters of interest for ad targeting are known ahead of time from the local schedule files, as described further below, and other relevant information that is known or may be obtained from other sources. The cue signals that an avail is coming up within the linear programming stream, and passes parameters for inserting content into the avail, such as the start and end time, or the start time and the duration. The relevant standard for constructing a cue message for a linear programming stream can be found in SCTE 35 (see https://www.scte.org/SCTEDocs/Standards/SCTE%2035%202017.pdf), incorporated herein by reference.

Once the cue message is detected by the video server 230, the ad request is sent to the ad manager 240 for processing with regard to selection of digital content for insertion. The ad request is constructed as a data packet with a number of required and optional fields for passing parameters to the ad manager, such as program identification, program type, avail start time, and avail stop time, and as noted above, many of these parameters are known prior to receiving the cue message. Therefore, the ad request can be built ahead of time and sent upon receiving the cue message, with or without additional parameters passed via the cue message. In one embodiment, the data packet can be constructed to include one or more configurable data fields that can be filled by the video server 230. For example, the video server or other designated server can obtain estimates related to viewing audience for the avail in terms of number of impressions, demographics, psychographics, consumer purchaser information, etc., from a third-party audience measurement service 260 or from the aggregation of tuning data from an MVPD, and provide those estimates to the ad manager 240 as a key parameter for ad targeting.

Once the ad request is received by the ad manager 240, the ad manager identifies a digital ad that meets the parameters of the request, then prepares a VAST response and sends the response back to the video server 230 for handling the insertion. The relevant standard for constructing a VAST response be found on the Interactive Advertising Bureau website (see https://www.iab.com/guidelines/digital-video-ad-serving-template-vast/), incorporated herein by reference. For instance, the cue message for a specific ad break (time/duration and program) on a specific network (like HGTV) will be read by the video server 230 and passed to ad manager 240. The associated servers 250 will be polled, or previously had been polled, to obtain the associated data included in the VAST request. The video server 230 and/or video server resources 250 also query other databases as appropriate, such as the viewer measurement server 260, to acquire the number of STB's tuned to this network as this time, and other databases as possible and relevant to further define the targets for the break and to complete preparation of the VAST request.

The video server 230 will, as needed, retrieve the identified digital ad from storage and send it to its ad splicer component, which will directly insert the file into the linear programming stream at the designated ad insertion point.

In one embodiment, the ad manager 240 is a local instance of Google Ad Manager, but this decisioning unit could be implemented using technology from Cadent, Freewheel, or other ad decisioning platforms. An example of how to prepare a master video tag with Google Ad Manager for retrieving video ads in provided at the Google Ad Manager Help (see https://support.google.com/admanager/answer/1068325?hl=en). An example of in-stream ad insertion is also described in U.S. Pat. No. 8,738,787 entitled Ad Server Integration, which is incorporated herein in its entirety. Other embodiments can include other digital ad servers.

Data regarding audience measurement of actual viewing and viewer demographics is obtained from a third-party audience measurement service 260 such as Nielsen, Comscore, or other companies that aggregate subscriber tuning (viewing) data, or even the MVPD itself, which may have the ability to aggregate tuning data from its set top boxes or servers. For example, a critical question for an advertising campaigns is how many viewers are tuned to (watching) a particular program at a particular time. The server of the measurement system can provide an estimate of the number of ad impressions expected to be delivered by an ad insert prior to the ad selection decision. The audience measurement system can also identify the type of program (available from published schedules) and when combined with other audience data sets, include additional viewer demographic information such as age, gender, geographic location, and psychographics, or even what kinds of products that consumer purchases in stores. The ad targeting criteria can then be established and placed into the configurable data field of the ad request using well known methods.

The audience measurement service or the MVPD that collects tuning data may also provide an actual count of impressions delivered after the ad insertion for purposes of reconciling with the forecasted impression load.

Figure 3:
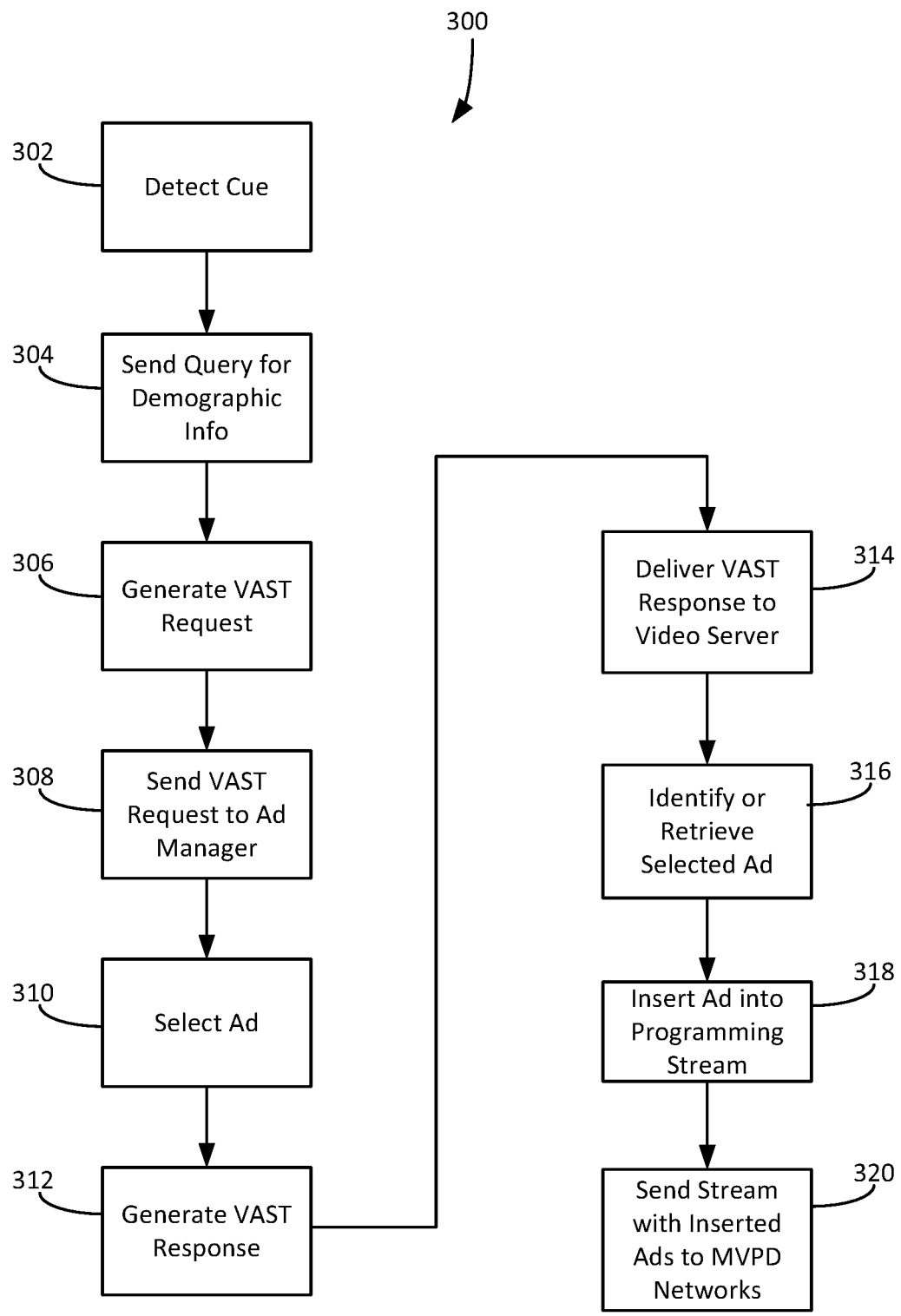
FIG. 3 is a flow chart illustrating a process for inserting ad content.

Referring to FIG. 3, a process 300 for inserting ads in video streams is illustrated. In step 302, a cue message is detected in the video stream received at the video server/ad splicer. The cue message is formed in accord with SCTE 35 and provides information regarding the location of the ad spot(s) in the video stream, such as the time point the ad spot starts in the video stream and the duration, although different providers may generate different formats for the cue message. For example, an SCTE 35 cue message is usually a binary message encoded in Base64, and consists of a data packet with a number of fields that are used to describe attributes of the cue message. Although process 300 addresses a single cue message, in reality, a large number of cue messages are received in multiple programming feeds from multiple content providers.

In step 304, after detecting a cue message, the video server sends a query to obtain audience information for ad targeting, for example, an estimate of how many viewers are tuned to the channel for this programming feed at the requested time for ad insertion. Such information may be available from a third-party service. For example, some media measurement companies and MVPDs themselves may have an automated STB measurement/tracking solution that knows what every set top box in its network is tuned to and can therefore estimate how many ad impressions can be delivered at a particular time for a particular program. Other providers have additional useful information regarding customer viewing or purchasing habits, such as Experian, Nielsen Data Plus Math, Samba TV, iSpot.TV and others.

In step 306, a VAST request is generated to include configurable data fields as needed and appropriate. The VAST request is an XML data structure that indicates to the ad serving network when the ad avails will occur in the video stream and the duration of the avails. The demographic information or any ad targeting information can be added to the configurable data field to provide ad targeting criteria. The programmer's video commercial format is typically known from a periodic schedule distributed by the various content providers.

In step 308, the VAST request is sent to an ad manager for ad decisioning. For example, Google Ad Manager provides a variety of features for managing ad insertion, and may be implemented in a customized, local instance. In step 310, the ad manager selects or identifies an ad that meets the targeting criteria. The ad must be approved to play over the MVPD's network, and typically the video file has been prepped for playout on the MVPD's network, to include compliance with various advertising regulations and guidelines, including CALM compliance.

In step 312, the ad manager generates a VAST response to the VAST request, which describes the ad that should be played. The selected ad may be identified by providing a link to the ad location, or by actually retrieving the ad from local storage on the video server 230 or external resource 250. In one embodiment, the selected ad is identified by the ad manager in step 314 and the VAST response is delivered to the video server 230 in step 316. In another embodiment, the selected, pre-approved ad is retrieved by the video serving platform 130 after receiving the VAST response that identifies the (out of local network) location of the selected ad. The ad is then retrieved, encoded, distributed and stored in the Media Serving Platform for playout upon next request.

In step 318, the ad splicer inserts the selected ad into the video stream. Finally, in step 320, the modified video stream with inserted ad is transmitted to the various MVPD networks that are configured to display that video format. Thus, process 300 allows digital ad content to be inserted into any type or format of digital video stream, from any content source to any content distributor, whether cable TV, satellite TV, IPTV, or OTT.

Figure 4:
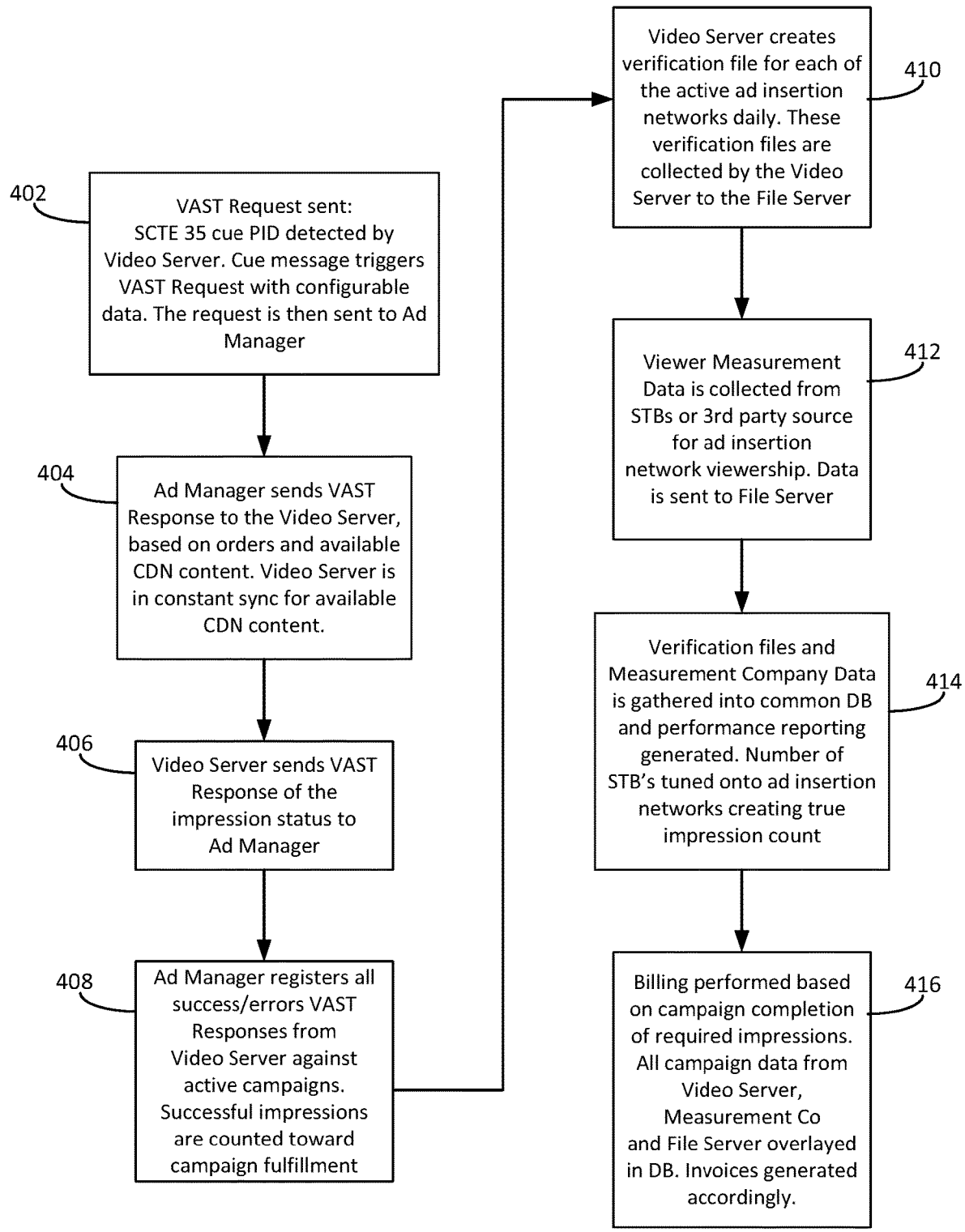
FIG. 4 is a flow chart illustrating another process for inserting ad content.

Another process 400 for inserting ads is illustrated in FIG. 4, with reference to the system 200 of FIG. 2. In step 402, the cue message in the linear programming stream is detected by the ad splicer/video server 230, and the cue message is used to trigger a VAST request having configurable data, which is then sent to the ad manager 240. In step 404, the ad manager 240 sends a VAST response back to the video server 230. The response includes ad targeting based on audience viewer information, and the response is also based on customer orders and availability of content, e.g., from storage in the CDN server 251. The video server 230 is in constant sync with the CDN server 251 so as to have current knowledge of the ad availability.

In step 406, the audience impression status, included in the VAST confirmation, is uploaded to the ad manager 240. In step 408, the ad manager registers all successes and failure of ad insertion at the video server 230. Successful impressions are counted toward ad campaign fulfilment.

In step 410, the video server 230 periodically creates a verification file for each of the active ad insertion networks, e.g., daily. The verification files are collected into the file server 252.

In step 412, viewer measurement data is collected from the set-top-box ("STB"), either directly or via third party viewership aggregation platforms, and this information is sent to the file server 252. In step 414, the viewer measurement data and the verification files are sent to the database 253 and performance reporting is generated. The actual verification and reporting of impressions served may come from a third-party audience measurement service or from the aggregation of tuning data from an MVPD. For example, the number of STBs tuned to the inserted ad represents the true household impression count.

Finally, in step 416, billing for ad insertion is performed based on campaign completion of required impressions. Relevant data is collected into the database 253 from the ad manager 240, the resources 250, and the viewer measurement server 260, and a final count of impressions served may be obtained from a third-party measurement service or from the aggregation of tuning data from an MVPD.

Figure 5:
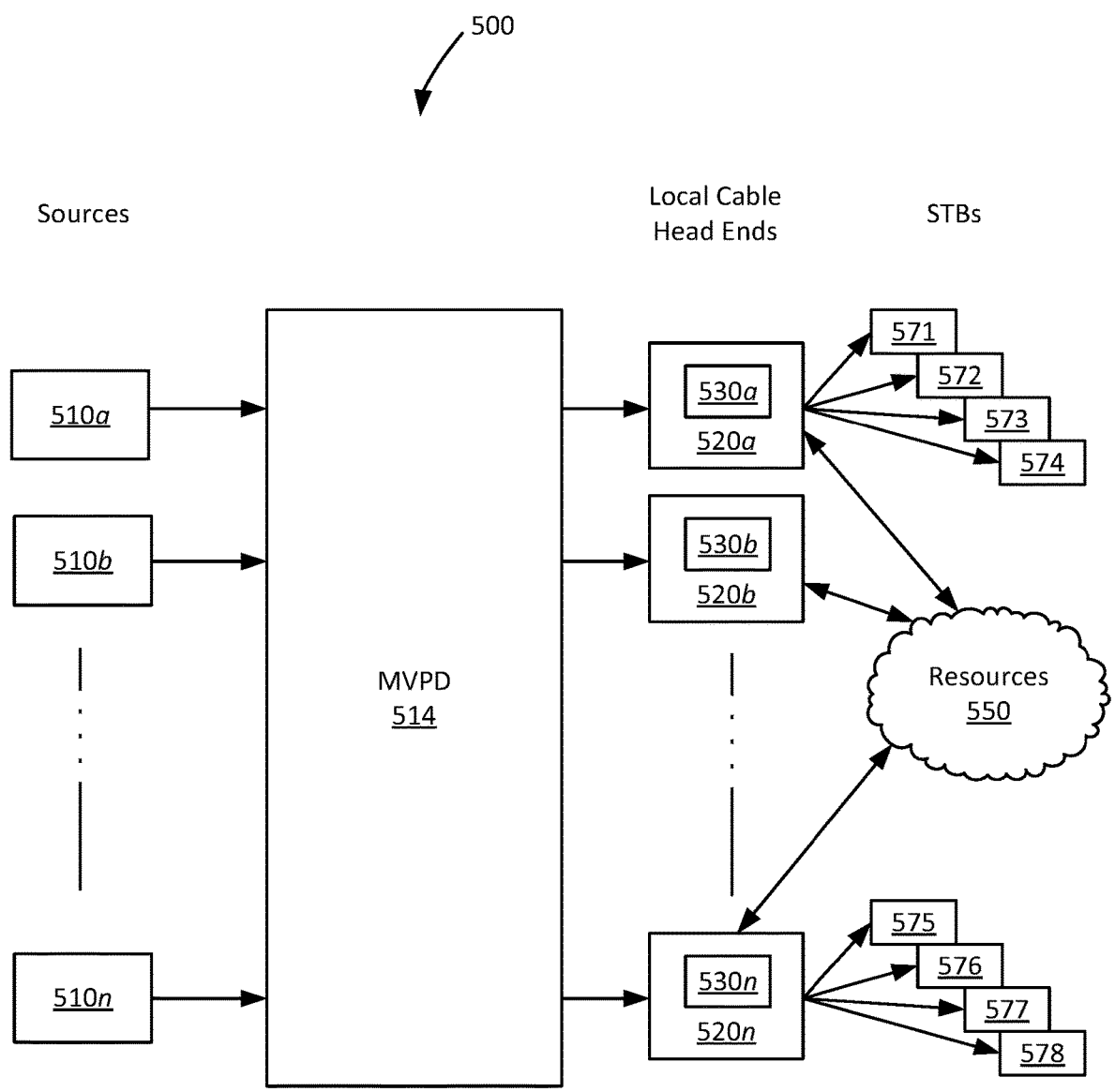
FIG. 5 is a block diagram illustrating a third embodiment of a system for inserting ad content into a linear programming stream.

An alternative embodiment showing system 500 is illustrated in FIG. 5. In this embodiment, a number of different content sources 510a through 510n provide programming feeds for MVPD 514. The MVPD distributes its programming feeds to the head ends 520a through 520n of local cable providers, which in turn send their programming feeds to individual STBs 571-578, for example.

Incorporated within each head end 520a through 520n of the local cable providers are video serving units 530a through 530n, respectively. Further, resources 550 are available to each head end to provide the services and features found in the ad manager, CDN, file server, database, and viewer measurement server, as described above. The video serving units 520 are configured to detect a cue message in the respective linear programming feed, and to receive a VAST request incorporating ad insertion location from the cue message and audience-based ad targeting information from the resources. A VAST response is then generated to fill avails as described above.

As noted above, digital ad serving technology has provided the ability to hyper-target the right audience in filling digital advertising requests by providing much more detailed targeting criteria. For example, in addition to providing knowledge of the basic demographics, such as gender, age income, location, education, psychographic, etc., digital technology can provide many other types of consumer preference data, including behavioral data such as past purchasing history or browsing history; dayparting data, i.e., the particular time(s) of the day that the consumer is active; designated market area (DMA); and other forms of data mining that may be helpful in designing ad targeting criteria.

The universal nature of the video serving platform described herein enables it to work in a multi-cast environment (one video feed to many STB's) or a unicast environment (one video feed to one STB). Because digital technology currently allows STBs to be individually addressed, there is an opportunity in the unicast MVPD environment to send an individual ad to an individual STB that is "requesting" the ad, based on hyper-targeting audience criteria. This opportunity benefits from the viewer's interaction with various data sources that help to define the individuality of the viewer from a marketing perspective, thereby enhancing the ability to hyper-target the individual viewer. Thus, addressable advertising provides another opportunity for potential advertising revenues.

Figure 6A:
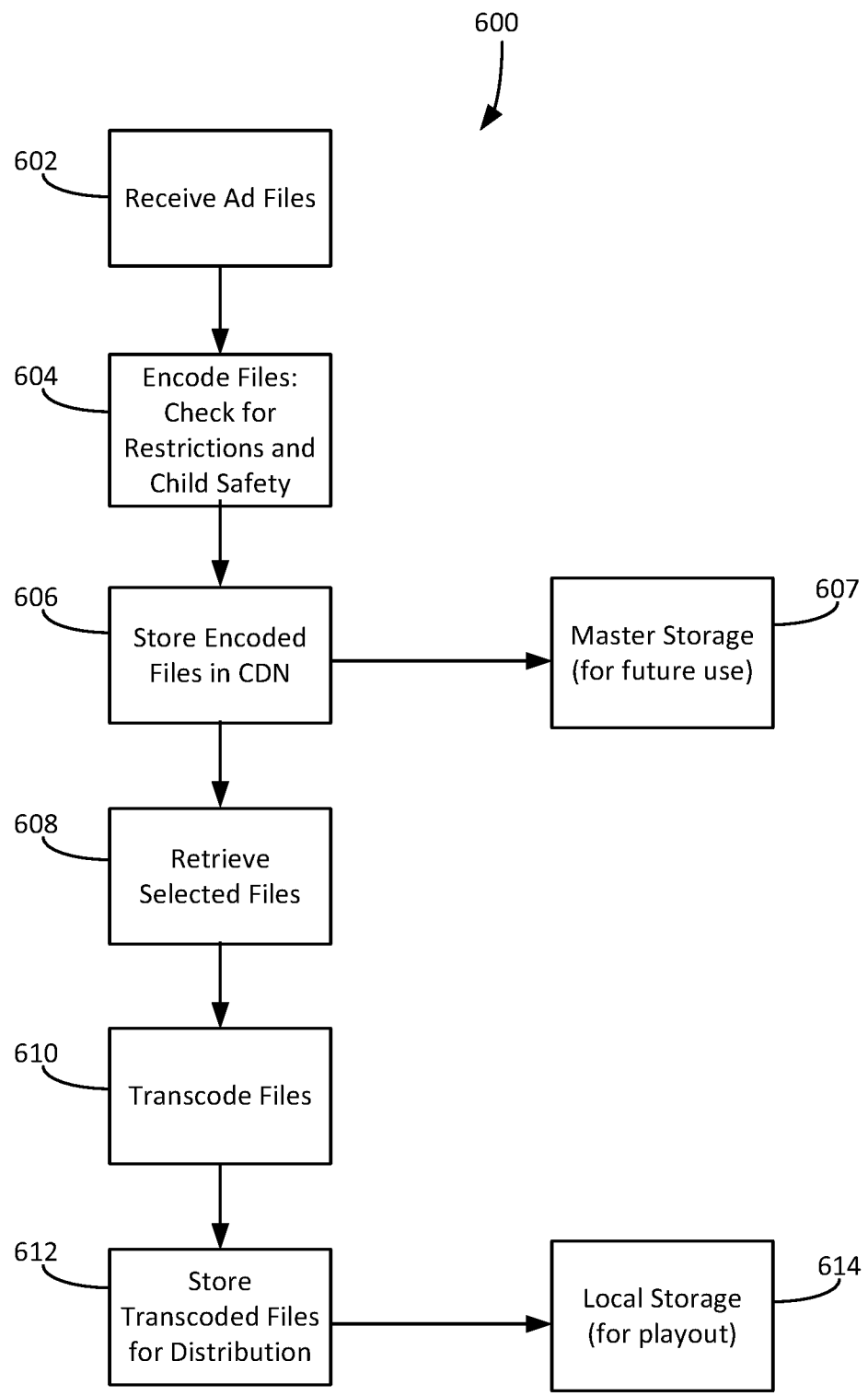
FIG. 6A is a flow chart illustrating a process for preparing an inventory of digital ads.

The ads to be inserted are (obviously) produced ahead of time by advertisers, provided to the ad serving network and stored for future use. A process 600 for receiving and storing the ads is illustrated in FIG. 6A. In step 602, ad files are received into the ad serving network, each file is encoded in step 604 and stored in the file server in step 606 and also stored to a master video file server in step 607 for future advertising needs. Files are retrieved in step 608. In step 612, the files are transcoded to the format of one or multiple specified content distributors. For example, the ad file may be converted from an MPEG2 source (commonly used in broadcast TV) to H.264 (MPEG4) video and AAC audio (common for streaming content). In step 614, the transcoded files are stored in the file server and available for selection and, in step 615, the transcoded files are sent to the local storage on the Media Serving Platform and available for ad insertion.

In one embodiment, a single ad spot may be transcoded into a number of different video formats such that the same ad (stored in different formats) can be provided to different content distribution networks.

Prior to storing ads for future use, each ad is reviewed for compliance with relevant regulations and guidelines. For example, each ad is reviewed to determine whether it contains salacious material, such as references to porn, guns, drugs, etc. Further, the video quality is reviewed, as well as any competitive risk posed by the ad. In addition, all ads must comply with the Commercial Advertising Loudness Mitigation ("CALM") provisions regarding audio volume.

Once ads are prepared, they may be sent to the video server or to a video cache or CDN. Low priority ads, overflow ads, and potential ads may be stored in a content distribution network coupled to the video server, and upon the first request for an ad by the ad decisioning server, the ad is pushed to the edge video server.

Ads may also be aggregated by a supply side platform ("SSP"), such as Adx, Freewheel, or Placemedia, that talks to the ad decisioning network. The SSP can aggregate ad inventory from any of the major MVPDs, such as Comcast, Charter, Altice, Cox, and others. The SSP can also receive instructions as to what ad inventory is available, for which networks, and for what time slots (for example, an MVPD may exclude prime time and the top 20-25 networks). Finally, the SSP can talk to a demand side platform ("DSP"), such as Trade Desk, Appnexus, Simplifi, Tube Mogul, and others, to engage is bidding for ad slots between the SSP and the DSP.

Figure 6B:
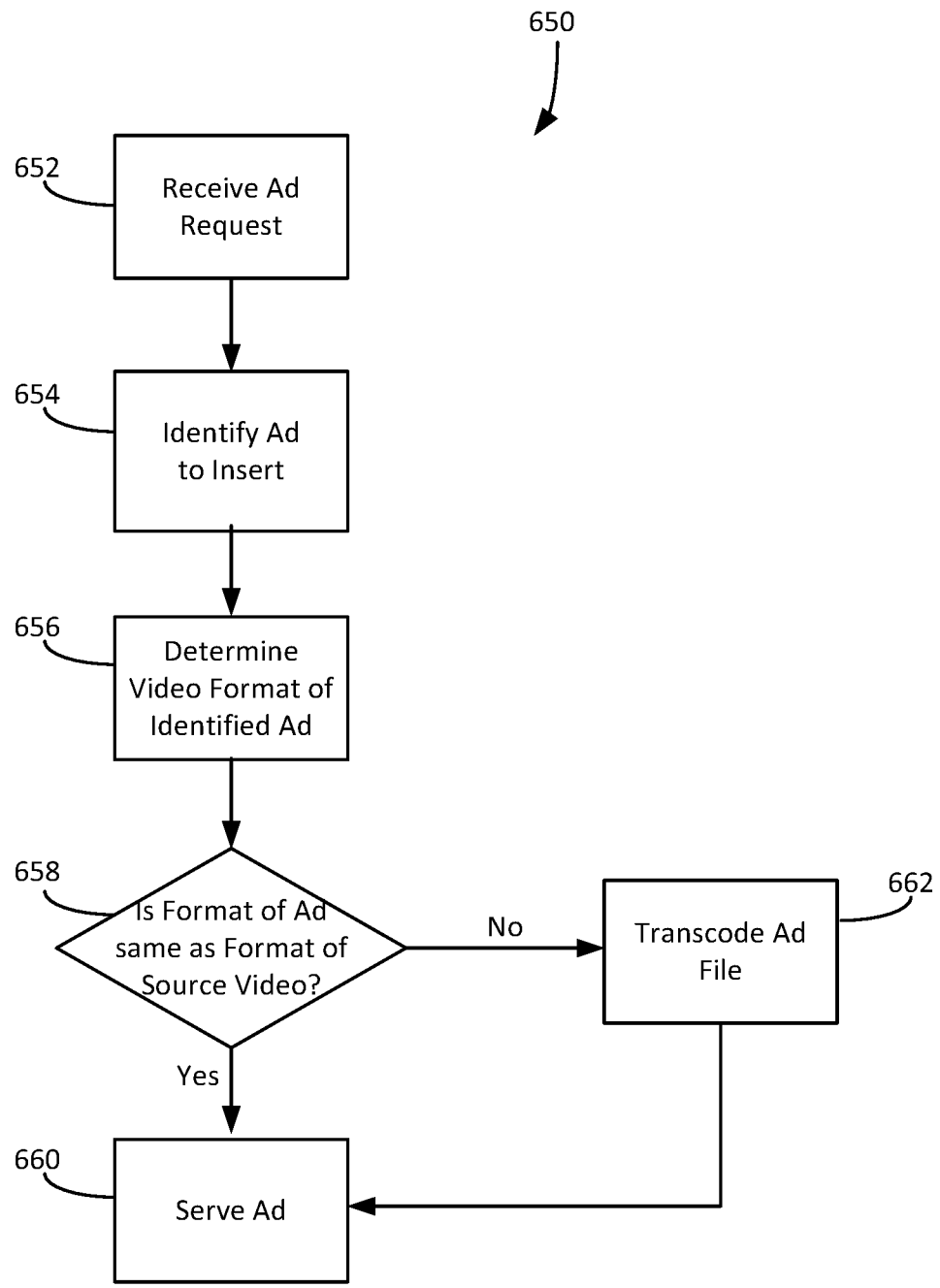
FIG. 6B is a flow chart illustrating a process for preparing a digital ad on the fly.

An alternative process 650 is illustrated in FIG. 6B. In step 652, an ad request is received at the ad serving network. In step 654, a suitable ad is identified, and in step 656, the video format of the identified ad is determined. If, in step 658, the video format of the identified ad is the same as the video format of the video stream that requested the ad, then in step 660, the ad is delivered. If the video format of the identified ad is not the same as the source video format in step 658, then the ad is transcoded on the fly in step 662 and then delivered in step 660. Typically, the location of the ad break in the digital stream is known at least a few seconds ahead of time, either in timing of the cue or, in the case of a "splice immediate" value in the cue message, with a configured buffer, in effect giving more time to complete the processes, thereby permitting a seemingly "live, real-time" ad insertion.

While the processes described above present a time-based ad insertion solution, it is also possible to have an event-based solution such as a live sporting event, and the cue message will include information to define the event and the ad insertion points.

Figure 7:
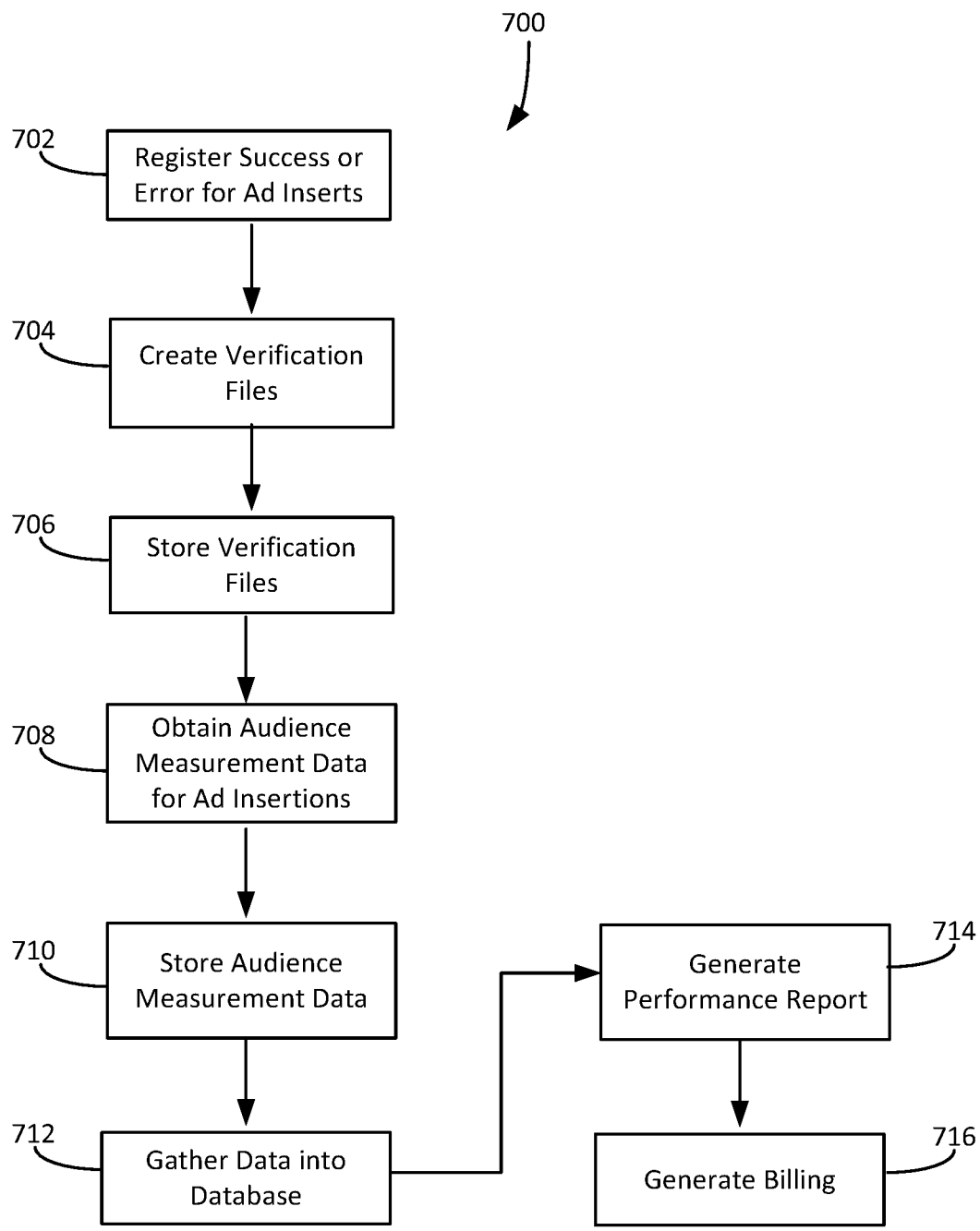
FIG. 7 is a flow chart illustrating a process for counting impressions to generate billings.

Turning now to FIG. 7, a process 700 for verifying and counting the number of impressions actually delivered is illustrated. In step 702, the ad serving network counts and registers all successful and unsuccessful ad inserts based on the responses from the video server. In one preferred mode, all successful impressions are counted towards a particular advertising campaign fulfillment. In step 704, verification files are created and periodically aggregated (e.g., daily) for each of the active ad insertion networks. The verification files contain information describing which ads were inserted into which networks, at what times. The verification files are stored in the file server in step 706.

In step 708, actual tuning (viewership) data related to the ad inserts is obtained, usually from a third-party service that measures actual viewing on STBs, for example. The viewership data indicates how many devices are tuned to a particular program, and for how long. This data provides a count of impressions delivered, and can also provide the demographic characteristics of the viewers. In step 710, the measured tuning (viewership) data is stored in the file server.

As an alternative, the verification files may be shared with the third-party service, which then obtains and stores the relevant audience measurement data and returns the data to the ad serving network.

In step 712, the verification files and the viewer measurement data are gathered into a common database, and may be used to generate performance reports in step 714. For example, the combination of the verification data and the viewer measurement data provides a true count of the household impressions actually delivered.

Finally, in step 716, billing to advertisers is generated based on the true count of impressions actually delivered for a particular ad campaign.

Although the foregoing methods and systems provide alternative ad insertion strategies for linear programming, the continued existence of legacy hardware presents some difficulties for implementing those strategies. For example, older ad splicers in some cable head ends may not accept a command to force the insertion of an ad from an alternative source, as described above. These legacy systems thus rely on the schedules published and distributed by programming networks to plan for and carry out ad insertions. However, this "time-based" approach to linear ad insertion can be adapted to use the techniques described above.

As an initial matter, each programming network creates and publishes a unique programming schedule for each day for each of its channels (if more than one) including the local ad break structure and ad insertion format. A number of third-party vendors consolidate and standardize the various network programming schedules into a comprehensive "programming file" having a standard format and commonly referred to as a CCMS schedule, after the company that first standardized this information, Cable Computerized Management Systems, Inc. For a fee, local stations or MVPDs can import the comprehensive programming file from a third-party into their local traffic and billing system, which enables them to create their own local ad insertion schedule file for scheduling ad placements and to bill for actual airings of ad copy. The scheduling information includes the approximate timing for local ads to be delivered and inserted by the ad insertion server in the local headend, by specifying an ad window at a fixed time and an ad break at an approximate time within the ad window.

For example, as illustrated in FIG. 8, a typical local ad insertion schedule file 800 has an eight-character filename such as "MDDCCHHH.SCH" where M represents month; DD represents day of the month; CC identifies the channel; and HHH identifies the headend. The typical schedule file has the file extension "SCH" and data records within the file contain twenty-four hours of programming information, typically midnight to midnight. There is also a standard verification file (not shown) with the same filename and the file extension "VER" that contains data records for everything that actually aired on the date.

The records contained in the local ad insertion schedule file (and the verification file) each include a number of predefined data fields, each data field containing relevant information about a network broadcast, as illustrated in FIG. 9, such as type of broadcast, scheduled date of broadcast, scheduled time of broadcast, etc. One record corresponds to one broadcast event.

Figure 10:
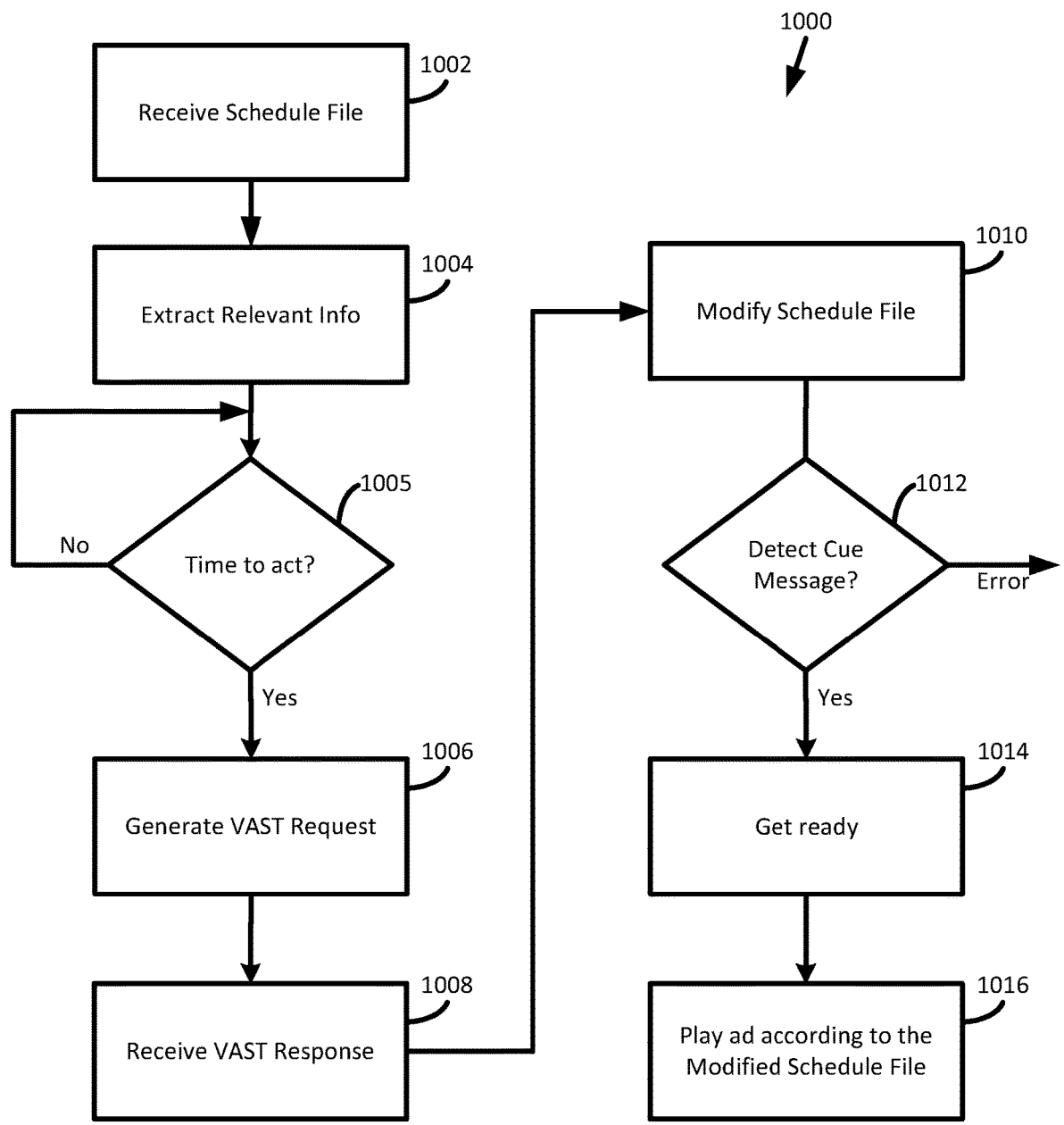
FIG. 10 is a flow chart illustrating a time-based process for ad insertion.

FIG. 10 illustrates a simplified process 1000 for time-based ad insertion in a linear programming feed. The process 1000 is typically implemented by one or more servers configured either as a web-based service or a hardware-specific solution for decision-making and ad selection/insertion. In step 1002, the daily ad insertion schedule files are generated in the traffic and billing portion of the system and received into the ad insertion portion of the system as well as sent to the ad serving hardware in the local headend. While the remaining steps are described with regard to a single ad insertion schedule file, it should be recognized that the process will be repeated for as many schedule files as are received. In step 1004, relevant information is extracted from the ad insertion schedule file, in particular, the expected start time of the ad window, and the expected duration of the ad window.

In one implementation, the video insertion hardware waits until shortly before the expected start time of the ad window before generating and sending the VAST request. Thus, in step 1005, if the time is x minutes before the expected start time of the ad window, the relevant information extracted from the schedule file and other sources is incorporated into a VAST request in step 1006 and sent to a third-party service to select and identify an ad for insertion in accord with the parameters provided in the VAST request. In step 1008, a VAST response is received identifying an ad to insert. In step 1010, the ad insertion schedule file is modified to replace the original ad spot identified in a data field of the ad insertion schedule file with the ad identified in the VAST response. The modified local ad insertion schedule file is then re-imported into the ad insertion platform and re-exported to the ad serving hardware in the headend. Now the system waits. When the SCTE 35 cue message is received in step 1012, then the ad insertion hardware is made ready in step 1014 and proceeds to play out the ad identified in the modified schedule file in step 1016.

Figure 11A:
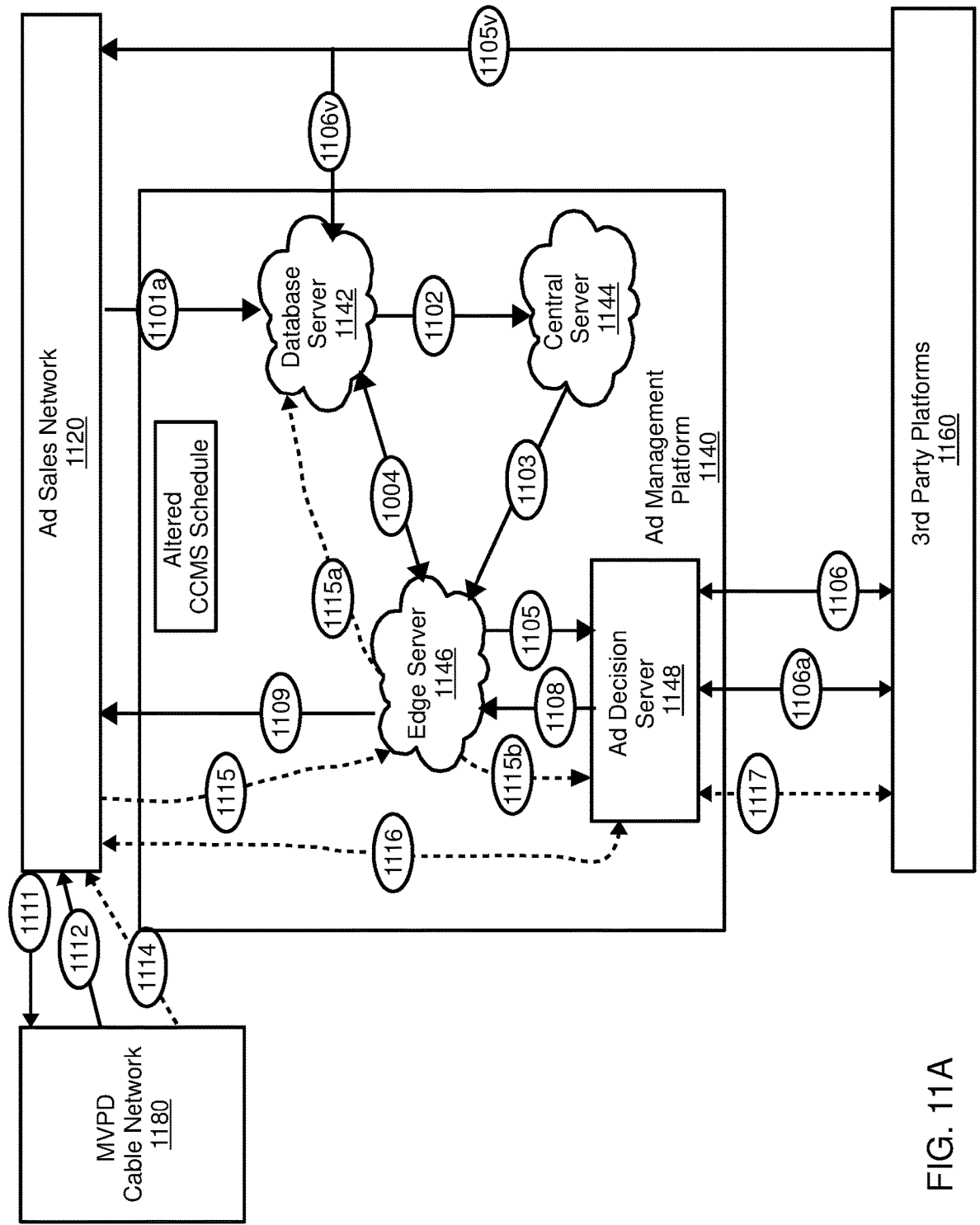
FIGS. 11A and 11B are flow diagrams illustrating the flow and interrelationships between various components of a time-based process for ad insertion.
Figure 11B:
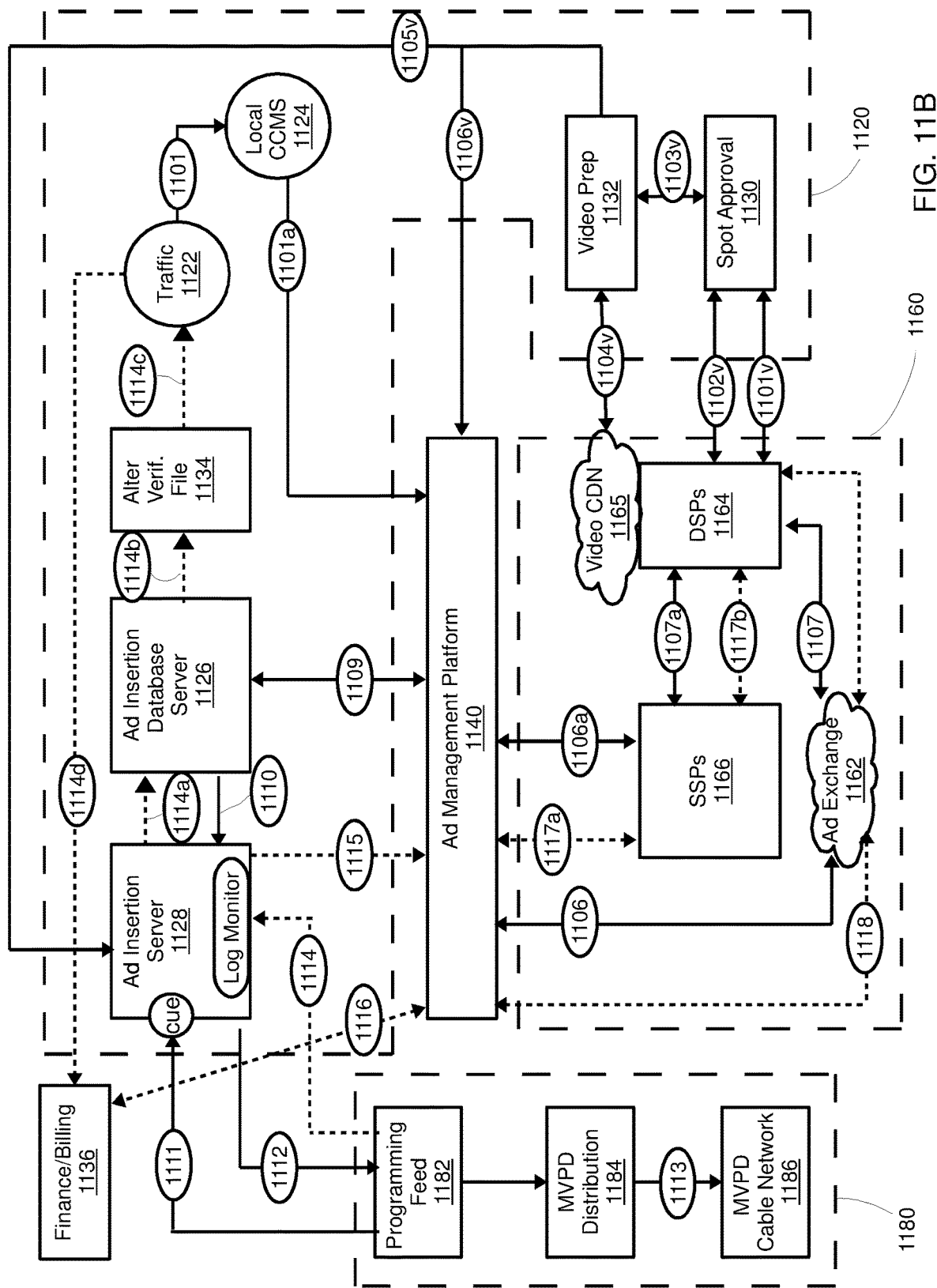

Referring now to FIGS. 11A and 11B, a detailed embodiment of a time-based workflow for ad insertion is illustrated that shows the interrelationships of the various components that are distributed among the various entities involved in the process, including the MVPD ad sales network 1120, the ad management platform 1140, various third-party ad content platforms 1160, and the MVPD cable system network 1180.

Traffic system 1122 is part of the ad sales network 1120 and is the beginning of the workflow when it receives the daily programming schedule files from a third-party vendor for channels offered by the MVPD to its subscribers. The traffic system 1122 via path 1101 generates the local ad insertion schedule files using ad placement data from the programming schedule files and the ad insertion orders from the various sales channels, and publishes the local ad insertion schedule files to the workflow path for further processing and distribution.

The schedule and related data are passed from the traffic system 1122 and other data sources 1124 via path 1101a to the database server 1142 on the ad management platform 1140. Although not illustrated, adequate memory and storage are available to each server in the ad management platform 1140.

The database server 1142 passes all the data for the VAST request via path 1102 to a central server 1144. The central server 1144 in turn passes the data provided via path 1103 to an edge server 1146. The edge server 1146 holds on to the data until it gets a trigger signal established by the database server 1142 analysis of the local ad insertion schedule file and shared with the edge server 1146. The edge server 1146 monitors the open window data in the relevant program schedule file and sets the trigger for initiating ad selection at the edge server 1146 at an appropriate time prior to the expected ad window. For example, the time for initiating the ad selection process may be set for 15 minutes prior to the ad window start time of the ad window in the schedule file or at some other time to provide more than adequate time for ad decision and selection given the variable ad window. When the time set for the trigger is detected, the edge server 1146 prepares and sends the VAST request via path 1105 to an ad decision server 1148, and the ad decision server forwards the request on to one or more third-party providers 1160. There is also a use case where the VAST request goes directly to third party providers, simply skipping the ad decision server 1148 if only acting as a pass through.

For example, the ad decision server 1148 can interact via path 1106 with an ad exchange service 1162, such as Google Ad Manager, in order to interact via path 1107 with demand-side platforms 1164 to engage in bidding for ad slots. If bidding is successful, then one of the DSPs 1164 returns information about the selected ad via path 1107 to the ad exchange 1162, which forwards the information via path 1106 back to the ad decision server 1148 for preparation of the VAST response.

It is noted that the information about the selected ad returned to the ad decision server 1148 typically does not include the video content of the ad itself, which is directed along a different path 1102v as further discussed below.

On alternative path 1106a, the ad decision server 1148 can instead interact directly with supply side platforms 1166 to engage in bidding for ad content, and if successful, information to fulfill the VAST request is returned via path 1106a to the ad decision server 1148.

One other alternative is that interaction with the DSPs 1164 can result in a transaction in the Private Marketplace ("PMP"), which can make ad space available before going to the open markets of the SSPs and DSPs. If so, then the PMP transaction is communicated via path 1107a to the SSPs 1166, which in turn communicate the transaction via path 1106a to the ad decision server 1148, or in some use cases, the SSP may communicate the VAST response via path 1106b directly to the edge server 1146.

Thus, upon selection of a replacement ad from the third-party platform 1160, the relevant information for a VAST response is provided back to the ad decision server 1148 (via path 1106 or 1106a), and the ad decision server prepares and returns the VAST response via path 1008 to the edge server 1146 identifying the replacement ad; or if the ad decision server is bypassed the VAST response may go directly to the edge server via path 1106b.

The edge server 1146 then modifies the schedule file to replace the originally identified ad with the replacement ad. The modified schedule file is sent via path 1109 to the ad insertion database server 1126 and then via path 1112 to the ad insertion server 1184 in the headend.

The ad insertion server 1128 monitors the programming feed 1182 from the MVPD cable system 1180 via path 1111 in order to detect the SCTE 35 cue message in the programming feed. When the cue message is detected, the ad insertion server 1128 inserts the ad identified in the modified schedule file via path 1112 into the programming feed at the local MVPD headend 1184, and the replacement ad plays out to subscribers 1186 via path 1113.

Returning to the question of ad video content, when an ad has been selected through the third-party platform 1160, the ad content is sent to the sales network 1120 via path 1101v for spot approval 1130. Whether the ad content is approved or not is provided as information via path 1102v back to the DSPs 1164. If the ad content is approved, it is passed via path 1103v to module 1132 for formatting and other preparation, then uploaded and saved into a content delivery network ("CDN") 1165.

The video content for the replacement ad is retrieved from CDN 1165 and transmitted to the ad insertion server 1128 in advance of any associated VAST response. The ad insertion server inserts the video content via path 1112 into the programming feed at the specified time.

Once the replacement ad has played out, the MVPD network 1184 generates a verification log and sends the log via path 1114 to the ad insertion server 1128. The ad insertion server 1128 in turn sends the verification log to the ad insertion database server 1126 via path 1114a, and also provides the playout status to the edge server 1146 via path 1115. The ad insertion database server 1126 alters the original verification file at module 1134 via path 1114b to fail the original ad; that is, the original ad was preempted by the replacement ad and therefore the original ad did not play and that "Failed" status is recorded in the modified verification file. The modified verification file is finally sent to the traffic system 1122 via path 1114c, which compares the insertion order to the verification file, creates a billing record of such ads and sends the compiled billing files to the finance and billing module 1136 via path 1114d at the appropriate time for billing processes to start. The finance and billing module 1136 processes the information supplied by the modified verification log and the linear order information to create the billing files for printing and electronic delivery.

The edge server 1146 passes the comprehensive transaction data provided via path 1115 to the database server 1142 via path 1115a for monitoring and reporting. The edge server 1146 also sends the data to the ad decision server 1148 via path 1115b for forwarding to the finance and billing module 1136 via path 1116 to reconcile billing data. The ad decision server 1148 receives billing and reconciliation data from the SSPs 1166 via path 1117a, which in turn obtains data from the DSPs 1164 via path 1117b, or directly from the DSPs (through ad exchange 1162) via path 1118. The database server 1142 stores the data for reconciliation with revenue and billing performance data compiled by the SSP 1166 for remuneration to inventory publishers.

Thus, the alternative method simply alters the schedule file to replace the original ad spot with a replacement ad selected using the VAST protocol for ad selection.

The foregoing description has been presented for the purpose of illustration and description. It is not intended to be exhaustive or to limit the disclosure to the precise form disclosed. Many modifications and variations are possible in light of the above teachings. It is intended that the scope not be limited by this detailed description, but by the claims and the equivalents to the claims appended hereto.

The invention claimed is:

1. A method implemented in a video serving platform, comprising:
    creating an ad insertion schedule file for a broadcast event to be transmitted at a later time in a linear programming feed, the ad insertion schedule file including at least one data record having a plurality of data fields for providing information about the broadcast event including a plurality of ad insertion parameters, the plurality of ad insertion parameters including a start time of an ad window during the broadcast event, a duration of the ad window, an identification of a planned ad spot for playout during an ad break in the ad window, and an identification of a channel of the broadcast event;
    extracting the ad insertion parameters from the schedule file;
    generating a VAST request for an ad to insert into the ad break of the ad window, the VAST request having a plurality of data fields, at least some of the plurality of data fields are configured to include the extracted ad insertion parameters;
    sending the VAST request to an ad selection service;
    receiving a VAST response from the ad selection service identifying a first digital ad on the basis of the ad insertion parameters;
    modifying the schedule file to replace the identification of the planned ad spot with an identification of the first digital ad;
    detecting a standard-compliant cue message in the linear programming feed carrying the broadcast event, the cue message indicating that the ad break is upcoming; and
    serving, on the basis of the modified schedule file and the cue message, the first digital ad into the ad break.

2. The method of claim 1, further comprising:
    defining an action time prior to the start time of the ad window; and
    initiating the step of sending the VAST request to the ad selection service at the defined action time.

3. The method of claim 1, further comprising:
    the ad insertion parameters include an identification of at least one network and an identification of a program genre associated with the broadcast event.

4. The method of claim 1, further comprising:
reporting the status of the planned ad spot as not played.

5. The method of claim 1, further comprising:
generating a verification log that identifies as played out the first digital ad.

6. The method of claim 5, further comprising: the verification log identifies as not played out the planned ad spot.

7. The method of claim 1, further comprising:
incorporating a plurality of ad targeting parameters into at least one of the data fields of the VAST request; and
the VAST response identifies the first digital ad on the basis of the ad insertion parameters and the ad targeting parameters.

8. The method of claim 7, further comprising:
obtaining historical audience viewership information to use as an estimate of impressions that will be delivered during playout of the first digital ad; and
incorporating the audience viewership information as an ad targeting parameter.

9. The method of claim 8, wherein the audience viewership information includes number of impressions, applicable zip codes, and audience demographics including age, gender and income.

10. A system for inserting ads into a linear programming feed, comprising:
a video serving apparatus in communication with a cable television headend, the video serving apparatus having a plurality of input channels, a plurality of output channels, and at least one processing unit, the cable television headend is configured to receive a plurality of linear programming feeds from a multi-channel video distributor (MVPD) and to distribute the plurality of linear programming feeds to customers through set top boxes installed at subscriber locations;
the video serving apparatus is configured to:
create a plurality of schedule files, each schedule file corresponding to a broadcast event at a later time and associated with a respective one of the plurality of linear programming feeds, each schedule file is a data record having a plurality of data fields for providing information about the broadcast event including a plurality of ad insertion parameters, the plurality of ad insertion parameters including a start time and a stop time of an ad window during the broadcast event, an approximate start time of an ad break during the ad window, a duration of the ad break, an identification of a planned ad spot for the ad break, and an identification of channel of the broadcast event;
extract at least some of the plurality of ad insertion parameters from respective ones of the plurality of schedule files;
generate VAST requests for ads to insert into the ad breaks of respective ad break windows, the VAST requests each having a plurality of data fields, at least some of the plurality of data fields are configured to include the ad insertion parameters;
receive VAST responses to VAST requests identifying a replacement ad for each planned ad spot on the basis of the ad insertion parameters for the respective broadcast event;
modify the plurality of schedule files to replace respective planned ad spots with respective replacement ads; and
for each of the plurality of programming feeds, play out the respective replacement ad identified in the respective modified schedule file in a corresponding output channel upon detection of a standard-compliant cue message in the respective one of the plurality of linear programming feeds.

11. The method of claim 10, further comprising:
incorporating a plurality of ad targeting parameters into at least one of the data fields of respective VAST requests; and
the VAST responses identify the respective replacement ads on the basis of the ad insertion parameters and the ad targeting parameters.

12. A method, comprising:
creating a schedule file for a broadcast event to be transmitted at a later time, the schedule file identifying an ad window and an ad break in the broadcast event and a planned ad to be played out during the ad break;
obtaining a replacement ad for the planned ad prior to the ad window;
modifying the schedule file to replace the planned ad with the replacement ad;
transmitting the broadcast event at the later time as a linear programming feed;
detecting a standard-compliant cue message in the linear programming feed, the cue message indicating that the ad break is upcoming in the linear programming feed;
serving the replacement ad into ad break of the linear programming feed in accord with the modified schedule file.

13. The method of claim 12, further comprising:
obtaining historical audience viewership information and use to estimate impressions that will be delivered during playout of respective replacement ads; and
incorporating the audience viewership information as an ad targeting parameter.

14. The method of claim 12, further comprising:
the schedule file includes ad insertion parameters; extracting the ad insertion parameters from the schedule file;
generating and sending a VAST request to obtain the replacement ad, the VAST request including the ad insertion parameters; and
receiving a VAST response identifying the replacement ad on the basis of the ad insertion parameters.

15. The method of claim 14, further comprising:
the schedule file includes ad targeting parameters; extracting the ad targeting parameters from the schedule file and other sources;
generating and sending a VAST request to obtain the replacement ad, the VAST request including the ad insertion parameters and the ad targeting parameters; and
receiving a VAST response identifying the replacement ad on the basis of the ad insertion parameters and the ad targeting parameters.

16. A digital ad insertion apparatus, comprising:
a video serving system having a plurality of input channels, a plurality of output channels, and at least one processing unit, the video serving system configured to communicate with at least one MVPD cable television distribution network having a plurality of linear programming feeds;
a plurality of schedule files received into and distributed by the video serving system for a plurality of broadcast events to be transmitted at a later time over the plurality of linear programming feeds, the plurality of schedule files each including at least one data record having a plurality of data fields for providing information about the respective broadcast event including a plurality of ad insertion parameters, the plurality of ad insertion parameters including a start time and a stop time of an ad window, and an estimated start time of an ad break during the ad window, a duration of the ad break, an identification of a planned ad spot for the ad break, and an identification of a channel of the broadcast event;

the at least one processing unit configured to, for each broadcast event:
- extract the ad insertion parameters from the respective schedule file;
- generate and send a VAST request to obtain a replacement ad, the VAST request including the ad insertion parameters;
- receive a VAST response identifying the replacement ad on the basis of the ad insertion parameters and ad targeting data; and
- modify the respective schedule file to replace the planned ad with the replacement ad;

each input channel of the video serving system configured to receive a respective one of the plurality of linear programming feeds and to detect a standard-compliant cue message in a respective one of the plurality of linear programming feeds, the cue message indicating that the ad break is upcoming; and each output channel of the video serving system configured to play out the respective replacement ad to the MVPD cable television distribution network in accord with the modified schedule.

17. The digital ad insertion apparatus of claim 16, further comprising: the at least one processing unit is configured to wait to send the VAST request until a defined time prior to the approximate start time.

18. The digital ad insertion apparatus of claim 16, further comprising:
the at least one processing unit is configured to:
- obtain ad targeting parameters,
- generate the VAST request,
- send the VAST request to obtain a replacement ad, the VAST request including the ad insertion parameters and the ad targeting parameters; and
- receive a VAST response identifying the replacement ad on the basis of the ad insertion parameters and the ad targeting parameters.

19. The digital ad insertion apparatus of claim 18, further comprising:
the at least one processing unit is configured to:
- obtain historical audience viewership information to use as basis of an estimate of impressions that will be delivered during playout of the first digital ad; and
- incorporate the viewership audience information as an ad targeting parameter.

* * * * *